Figure 1:
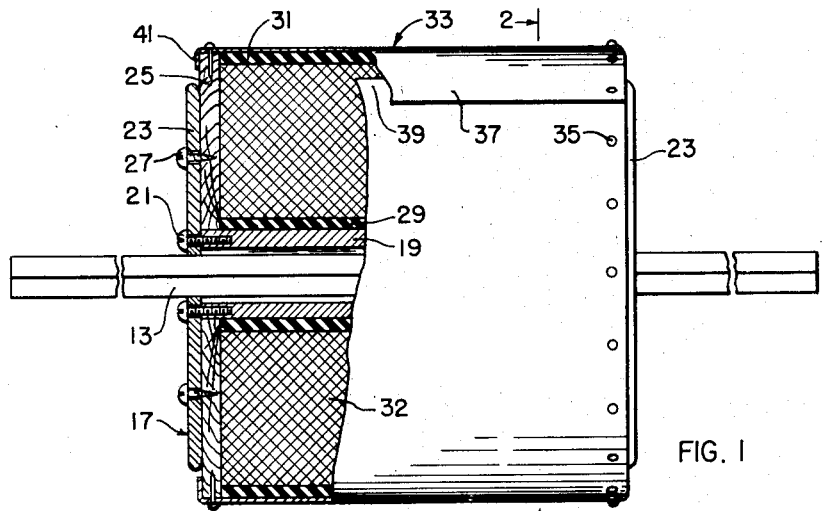

Nov. 10, 1953    B. B. SCOTT, JR    2,658,263
METHOD OF WINDING AND PACKAGING COILS
Filed Dec. 21, 1949

*INVENTOR.*
BENJAMIN B. SCOTT JR.
BY Lawrence Glassman
Attorney

Patented Nov. 10, 1953

2,658,263

UNITED STATES PATENT OFFICE 2,658,263

METHOD OF WINDING AND PACKAGING COILS

Benjamin B. Scott, Jr., Schenectady, N. Y.

Application December 21, 1949, Serial No. 134,312

6 Claims. (Cl. 29—148)

(Granted under Title 35, U. S. Code (1952), sec. 266)

The invention described herein may be manufactured and used by or for the Government for governmental purposes, without the payment to me of any royalty thereon.

This application is a continuation-in-part of my previously filed copending applications, Serial Numbers 674,410, now Patent No. 2,552,594, 674,411, now Patent No. 2,639,097, and 674,412, all filed on June 5, 1946.

The present invention relates to improvements in methods of winding and packaging coils.

In the present application, the invention will be illustrated in connection with coils of insulated electrical wire, for telephone and telegraph communication, but it will be understood that the invention is applicable to many other elongated coilable materials, such as rope, twine, flexible tubular conduit for electrical wires, multiple conductor cables, uninsulated wire, flexible stranded wire rope, etc., and hence should not be deemed to be limited to the illustrated embodiment.

As used in the present application, the word "coils" shall be used in its broadest sense, and shall be deemed to include any and all types of windings of elongated materials (such as rope, wire, etc.), wherein the said material is wound about an axis, irrespective of the geometrical shape (as spherical, cylindrical, etc.) and irrespective of the type winding (as level layer wound, honeycomb, etc.) and irrespective of the pitch at which the turns are wound.

The conventional manner of paying out or laying telephone wire and the like is to unwind it from a spool or reel, which is rotated about its axis during the laying process. This method has a number of drawbacks, among which are the fact that it requires a certain amount of heavy equipment, namely the reels and equipment to rotatably sustain the reels during unwinding; that friction and the inertia of the reels and the wire thereon must be overcome as the wire is unwound so that laying at high speeds is not practicable; that it usually is noisy in operation; and that continuous telephone or telegraph communication through the wire during the paying out operation is not possible.

Efforts to overcome the said objectionable characteristics have resulted in attempts to wind satisfactory coils of wire having hollow centers, so that the wire could be drawn out from the center without rotating said coils about their axes.

This was an improvement in some respects but, prior to the inventions covered in the present application and in my copending applications referred to above, it was found that, in the use of such coils, certain other objectionable characteristics appeared. For example, during laying, as one turn of the wire was being withdrawn, it would catch additional turns of the same layer, or even of other layers, and pull them out with it, thus resulting in snarls, knots, severe strains and even fractures of the wire, abrasions of the insulation, deformations of the lay-twist, etc. These objectionable characteristics are particularly likely to occur when but a few turns or but a few layers of the coil remain unwound, at which time all of said turns or layers may collapse completely and be fed out as a hopeless snarl. As a result of the foregoing the wire might be so damaged as to be unusable for communication purposes and also the effective length thereof might be greatly shortened. Also in such coils there was a great likelihood that, during ordinary handling of the coils before use or as they were being put into use, portions of the coils would collapse so as to make the coils unusable. Thus, said coils were found to be self-unloading at times when this was not desired. The weight of a few feet of wire hanging out of a coil or the accidental turning of a coil on its side might cause all of the wire in the coil to drop out in a tangle. This condition might be so bad that on occasion large portions of the coil might "spring" or "explode" out of a coil in snarled bunches, thus making the coil unusable.

Proper containers for coils of wire or the like, and manufacturing methods which combine the steps of winding and packaging them, are necessary or helpful in achieving a finished packaged product which is easy to store and transport and, in the case of some coils, cannot unwind unintentionally, which may be suitably sustained while being paid out so as not to interfere with the paying out operation and which prevents damage to the wire or other material wound on the coil and, in the case of tandem laying (as shown for instance in my copending application, Serial Number 674,413, filed June 5, 1946), prevents the telescoping of successive coils.

It is therefore an object of the present invention to provide coils of wire and the like and methods and means of winding and packaging them which simplify and improve the manufacture, handling, transportation, preparation for use, and use of such coils and packages.

It is yet another object to provide a coil, and a container therefor, which may be paid out satisfactorily at both high and low speeds.

It is still a further object to provide coils of wire or the like, and methods and means of winding and packaging them, so as to eliminate the need of reels or heavy laying equipment or the noises produced thereby and also to greatly reduce the amount of time and labor ordinarily required for the laying operation.

It is a further object to provide a coil of wire or the like which may be laid or fed out satisfactorily without the need of any moving parts.

It is a further object to provide methods and means of winding and packaging wire or the like in which may be incorporated one or more of the features of "pretwisting" (covered in my copending application, Serial Number 674,412), "turn-to-turn restraint" and/or "turn-to-container restraint" (covered in my copending application, Serial Number 674,411), and improvements in packages (covered in my copending application, Serial Number 674,410).

These and other objects and advantages of my present invention, which will be better understood as the detailed description progresses, are obtained in the following manner.

I provide a form upon which I both wind and package my coils. This form, which I refer to as a "winding reel," is of such structure that it supports portions of the finished package and the coil during both the winding and packaging steps of my method, whereupon the said winding reel may be disassembled sufficiently to permit the removal of the fully packaged coil from the core or mandrel of the winding reel. I also prefer to place a lining or wrapping about said core or mandrel and then wind the turns of the coil around said lining or wrapping. Said lining or wrapping also increases the inside diameter of the finished coil where it is desired to have it larger than the outside diameter of the core or mandrel of the particular winding reel being used.

In the accompanying specification there is described, and in the annexed drawing illustrated, what are at present considered preferred embodiments and methods of accomplishing my invention. It is, however, to be understood that the said invention is not to be limited to said embodiments and methods inasmuch as changes may be made without the exercise of invention and within the true spirit and scope of the appended claims.

Figure 2:
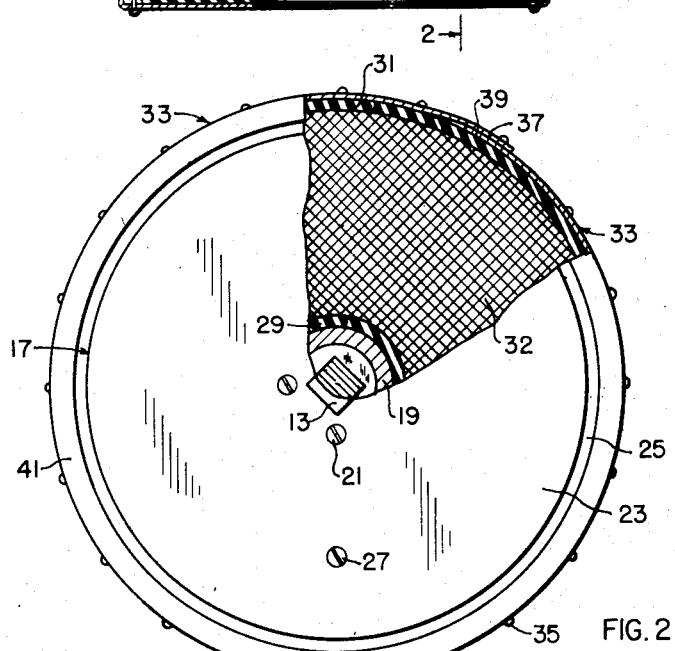
Figure 3:
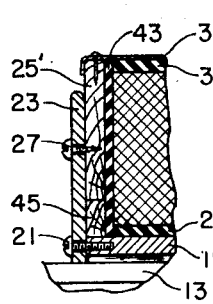

In the drawing, Figure 1 is a view, partly in elevation and partly in longitudinal cross section, of a coil of wire which has been wound and packaged according to the present invention, before it has been removed from the winding reel;

Figure 2 is a slightly enlarged left end view of Figure 1 partly cut away and sectioned along the line 2—2 of Figure 1; and Figure 3 is a fragmentary sectional view, of a portion of Figure 1, showing a modified form of my invention.

The drawing shows a winding shaft 13 of a coil winding machine, which shaft might be a component of any suitable winding machine, the machine however not being a part of the present invention. Illustrative examples of such machines may be seen in Figure 1 of my aforementioned copending application, Serial Number 674,411, where the winding shaft is designated by the reference numeral 33, and in Figure 1 of my copending application, Serial Number 674,412, where the winding shaft is designated by the reference numeral 15.

In the present application, the particular embodiment used to illustrate the invention makes use of a winding shaft 13 which is of square cross sectional configuration. Removably positioned upon said shaft 13 is a winding reel 17 which includes a tubular core or mandrel 19. An end plate or flange 23 is releasably secured, by any suitable means, as by machine screws 21, to each end of said mandrel 19. In the particular embodiment shown, each end plate or flange 23 is pierced by a square axial opening to accommodate the square shaft 13.

Before the coil is wound, a pair of flat annular end members or discs 25 are positioned on the mandrel 19 and against the inside surfaces of the flanges 23 respectively. This may be accomplished by separating one of said flanges 23 from the mandrel 19 by removing the screws 21. Although the discs 25 may be of any suitable material (wood, cardboard, blotting paper, metal, etc., being suggested in my aforementioned copending application, Serial Number 674,410), I am using wooden discs to illustrate the present invention. I sometimes find it convenient, although not always necessary, to secure each disc 25 to the flange 23 against which it rests, by some suitable temporary fastenings, such as wood screws 27.

The size of the pay-out opening in each disc 25 will depend upon a number of factors, such as the type of wire being wound, the conditions under which it will be paid out, the speed at which it will be paid out, the material of the end disc, etc. Openings ranging from very small to very large, to meet some of the different conditions are shown in my aforesaid copending application, Serial Number 674,410. In the drawing of the present application I show discs 25 which have openings of a size to just slip over the mandrel 19.

After the discs 25 are in place, I wrap one or more turns of a lining or wrapping 29 around the mandrel 19. A single layer of lining 29 with its adjacent edges in abutment is shown in the drawing. This lining 29 may be of any suitable material, but I have found half corrugated cardboard to lend itself very nicely to this use. By "half corrugated cardboard", I refer to that type which is made up of one sheet of corrugated cardboard and one sheet of flat cardboard so that it may be easily flexed about an axis parallel to the corrugations, but will not readily flex about an axis perpendicular thereto. I prefer to hold the lining 29 in place with a few strips of adhesive masking tape (not shown).

After the lining 29 is in place, the winding machine may be started in operation so as to rotate the winding shaft 13. During such rotation, wire 32 is wound around said lining 29 and between the discs 25 until the outside diameter of the coiled wire is somewhat less than the outside diameter of the discs 25. I preferably use some means to guide the wire 32 while it is being wound so as to maintain substantially level layers. Although this may be done by guiding the wire to-and-fro manually, I prefer to use some commercial level winding means (as suggested by the traverse cam 43 shown in Figure 1 of my aforementioned copending application, Serial Number 674,411).

As indicated in my copending applications, Serial Numbers 674,410 and 674,411, after sufficient wire 32 has been wound, I thread the outer end of the wire radially inwardly, along the inner surface of one of the discs 25, so that it will be positioned in the hollow center of the finished coil. As this is not part of the invention intended to be covered by the present application, it is not illustrated in the drawing hereof.

A packing 31 is then wrapped completely around the cylindrical surface of the coil of wire 32 and between the discs 25. Although any suitable packing material may be used, as shown in my copending application, Serial Number 674,411, I preferably first wind a layer of adhesive masking tape around the wire 32, followed by a layer of half corrugated cardboard which is pasted to the tape. This provides "turn-to-container restraint" and also fills in the space between the wire and a cylindrical wall or shell 33 of the finished container.

Said shell 33 may be made of various materials (metal, cardboard, fiber, plastic, etc., being suggested in my aforementioned copending applications), but in the present application I show a shell which is made of sheet metal. I find this strong enough for the intended purpose, also light in weight and easy to apply. I merely wrap it around the packing 31 and the end members or discs 25 and secure it to the peripheries of said discs by any suitable fastening means, such as a plurality of tacks 35.

The sheet metal used for the shell 33 should preferably be a rectangle of a sufficient width so that one edge portion 37 slightly overlaps the other edge portion 39. Also, it should preferably be long enough so that its ends extend somewhat beyond the discs 25. After the shell 33 has been tacked in place, these end portions, extending beyond said discs 25, are bent inwardly to form annular flanges 41 which help to give added strength and stability to the finished container. Preferably, the shell 33 is put in place while the coil is still on the winding reel 17.

The fully packaged coil may now be removed from the winding reel 17 by separating one or both of the flanges 23 from the core or mandrel 19 by removing the screws 21 and 27. Even though I have used "turn-to-turn restraint" in winding the coil, it usually separates from the mandrel 19 easily because the corrugated cardboard lining 29 has sufficient give to counteract any friction. I may remove the lining 29 at this time or may leave it to be removed when the coil is to be used. It is easily collapsed inwardly and removed from the coil.

In Figure 3, I show a slightly modified embodiment of my invention, wherein I add an annular lining disc 43 at each end of the coil. These lining discs 43 are positioned upon the mandrel 19 at the same time as the discs 25. I prefer that the lining discs 43 have a central aperture of a size to just slip over the mandrel 19 and I also prefer that said lining discs 43 be made of some friable material, such as cardboard, blotting paper, etc., for the reasons explained at length in my copending application, Serial Number 674,410. The said lining discs 43 also may have the function of constraining the turns of wire 32 against axial movement while the coil is being wound where one or both of the discs 25' have pay-out openings of a greater diameter than the diameter of the mandrel 19. In that event, I also prefer to supply an annular filler 45 which has an outside diameter to fit into the pay-out opening of the disc 25' and has an inside diameter to slide over the mandrel 19. This annular filler acts as a backing or support for the inner portion of the annular lining disc 43 and keeps it in its proper position during the winding operation.

Although not shown in the drawing, it is preferable that winding reels of different dimensions be provided. It is also convenient to provide a mandrel upon which at least one of the flanges can be locked at a plurality of positions along the axis of the mandrel so that coils of different axial lengths may be wound.

It will be seen from the foregoing that the coil is completely wound and also enclosed in a container before it is removed from the winding reel 17. Thus, during the winding operation, the turns of wire 32 are kept in position by the discs 25 which, in turn, are suitably constrained against axial movement by the flanges 23. Likewise, the other components mentioned are kept in place while the packing 31 and the shell 33 are applied.

While there have been described what are at present considered a preferred embodiment and method of accomplishing my invention, it will be obvious to those skilled in the art that many changes and modifications may be made therein without departing from the invention and it is aimed in the appended claims to cover all such changes and modifications as fall within the true spirit and scope of the invention.

What is claimed is:

1. The method of packaging wire within a can, which method comprises winding the wire into a coil on a mandrel between spaced discs that are to form the ends of the can, bracing the discs against stiff flanges that maintain the spacing of the discs and prevent the discs from bending while the coil is being wound, covering the coil with a cylindrical metal shell that extends somewhat beyond the discs, bending the ends of the shell inward over the discs to form a can while the discs are confined between the flanges, and thereafter removing the flanges and the mandrel.

2. The method of packaging wire comprising winding a coil of wire on a support and between end plates that limit the length of the coil, forming an enclosure around the coil while on the support and confined between the end plates, and then removing the end plates and withdrawing the support from the center of the coil leaving the wire coiled within the said enclosure.

3. The wire packaging method that comprises placing annular end discs against spaced but confronting faces of flanges that are located on a mandrel, winding a coil of wire on the mandrel by rotating the mandrel while traversing the supply of wire back and forth between the end discs to produce a coil having a length substantially equal to the distance between the end discs, continuing the winding until the coil extends for a substantial part of the diameter of the end discs, placing a cylindrical shell around the coil, securing the respective end discs to opposite ends of the cylindrical shell, and thereafter removing the flanges and withdrawing the mandrel from within the coil.

4. The method of making a package for a coil of wire which method comprises placing the ends of the package at spaced locations on a support and winding a coil of wire around the support and between said ends until the coil of wire reaches a preselected diameter, then forming the package for the wire by connecting the respective ends of the package with the opposite ends of a cylindrical shell that surrounds the coil and forms the side of the final package, and removing the said support.

5. The wire-packaging method comprising covering a mandrel between end discs with a tubular lining that is longitudinally split so that it can be collapsed when the mandrel is removed, winding a coil of wire over the lining and between the end discs until the coil acquires a predetermined diameter that is somewhat less than the diameter of the end discs, applying a shell around the coil, connecting the shell to the end discs to complete the package while the coil remains on the mandrel, and thereafter withdrawing the mandrel.

6. The wire packaging method comprising winding a coil of wire on a support between end discs until the coil reaches a predetermined diameter which is somewhat less than the diameter of the discs, placing a packing around the coil to fill in the additional radial distance between the diameter of the coil and the diameters of the discs, applying a cylindrical shell over the packing for the full length of said packing, and securing the shell to both of the end discs along the edges where the shell meets the discs.

BENJAMIN B. SCOTT, Jr.

No references cited.